Patented Sept. 10, 1940

2,214,559

UNITED STATES PATENT OFFICE 2,214,559

STABLE SOLUTION FOR PRODUCING ICE COLORS

Hans Z. Lecher, Plainfield, and Robert P. Parker, Somerville, N. J., assignors, by mesne assignments, to American Cyanamid Company, New York, N. Y., a corporation of Maine No Drawing. Application July 15, 1939, Serial No. 284,704

8 Claims. (Cl. 8—44)

This invention relates to the preparation of solutions of ice color compositions, and more particularly to the preparation of stable solutions for producing ice colors on the fiber.

One of the most satisfactory methods of producing insoluble azo or ice colors on textile material, particularly in printing on cotton and regenerated cellulose material is the process wherein a diazotized ice color component and an ice color coupling component are both contained in an alkaline composition, such as a paste, solution or the like, and stabilized to prevent azoic coupling wherein such composition is applied to the fiber and then treated with a weak acid to develop the color directly on the fiber.

Compositions of this kind are available on the market either in the form of powders or solutions. In the powder form these compositions are stable both as regards deterioration and as regards premature formation of the dyestuff. They must, however, be dissolved before they are put into printing pastes. The dissolving is a somewhat slow and delicate operation as many of the powders do not dissolve very readily. This is a serious disadvantage because complete dissolution is essential to obtain a smooth print and to avoid damage to the printing rolls by any gritty material that may be present. The printing paste, once it is prepared, has only a limited stability and usually decomposes after standing a few days at room temperature. Stock solutions as sometimes prepared from the powder form may result in producing a clear solution but the same difficulties are encountered as later described in connection with the solution form.

The ice color producing compositions of the kind referred to above are available on the market also in the form of alkaline solutions which can be made into printing pastes. These solutions, while easily incorporated into pastes, have not been satisfactory from other standpoints. The solutions known heretofore have not been very stable and the instability becomes manifest in several different ways. The diazo compounds decompose slowly with evolution of nitrogen and usually print works open the containers immediately after they are received to avoid breakage from the nitrogen pressure. The solutions may also contain undissolved material or may not stay clear and often reprecipitate one or more of the components. The apparently clear solutions sometimes form precipitates when diluted with the printing gum to give a granular paste.

According to the present invention, it has been found that by the use of quaternary nitrogen bases, dyeing and printing compositions capable of producing ice colors on textile materials can be prepared in the form of solutions and pastes which have greatly improved stability over previous solutions and pastes.

The stable compositions capable of producing ice colors and that may be used in carrying out the present invention are hereinafter described or defined.

One ingredient is a stabilized diazo compound and this may be produced from practically any ice color diazo component. The terms "ice color diazo component", "diazotized amine" or "diazo compound" when used in this specification refer not only to compounds containing one diazo group, but also to compounds containing two diazo groups, i. e., to ice color tetrazo components, tetrazotized diamines, and tetrazo compounds. It is to be further understood that these terms refer to such diazotized amines or tetrazotized diamines that are commonly used for producing ice colors, for which use they must be free from solubilizing groups such as sulfonic and carboxylic groups.

Typical amines are, e. g., aniline, its homologues, their halogen derivatives, their nitro derivatives, their alkoxy and aryloxy derivatives, their acyl amino derivatives, their sulfon and sulfonamide derivatives, their cyano derivatives, xenylamine, the naphthylamines, heterocyclic amines such as amino fluorenes, amino azo compounds, etc. Furthermore, diamines in which one of the amino groups only can be diazotized, such as 2,6-dichloro-1,4-phenylene diamine, can be employed. Diamines in which both amino groups can be diazotized, e. g., benzidine, derivatives of 4,4'-diaminostilbene, can be used. Where substituents are mentioned, it is to be understood that also substituents of different types may substitute the diazo component simultaneously, such as, e. g., in 2-methoxy-5-chloroaniline.

The diazo compounds used in the present invention may be stabilized by various methods. It is always to be understood that the stabilization must not be only stabilization of the diazo compound per se, but also against coupling in alkaline medium regardless of the base used to produce the alkaline medium. Therefore, stabilized diazonium salts cannot be used in compositions containing a coupling component.

One of the oldest forms of stabilized diazo compounds used in compositions capable of producing ice colors are the nitrosamines or isodiazotates. However, only a limited number of amines, mainly those having negative substituents, form sufficiently stable nitrosamines. Mixtures of such nitrosamines and coupling components are useful in the art of ice color printing though they are not very stable and develop the color slowly even when kept on the alkaline side. A similar type of stabilized diazo components are the diazo sulfonates.

However, a much superior form of stabilized diazo compounds useful in ice color producing compositions is obtained when diazo compounds are reacted with various nitrogen compounds that have attached to the nitrogen at least one hydrogen capable of being replaced by the diazo radical and contain at least one solubilizing group.

One very large group of these stabilized diazo compounds comprises diazo-amine and diazo-imino compounds in the production of which a primary or secondary amine containing solubilizing groups is used. Particularly important are amino sulfonic and amino carboxylic acids such as, e. g., methyl taurine, sarcosine, 4-sulfo-2-amino benzoic acid, pipecolinic acid, proline, amino acids resulting from the degradation of proteins, etc. In these cases the solubilizing group is an acidic group; the acidic group may also be the sulfamide group. However, it is known that the solubilizing group may also be an ammonium salt group or a polyalcohol radical as, e. g., in methyl-glucamine.

A second large group of stabilized diazo compounds useful in ice color producing compositions comprises diazo amidines and particularly diazo guanidines containing solubilizing groups such as sulfonic or carboxylic groups. The stabilizers from which they are produced contain amidine radicals such as guanidine radicals having at least one hydrogen attached to the nitrogen and capable of being replaced by the diazo radical. Examples of such stabilizers are various guanidyl sulfonic and guanidyl carboxylic acids such as guanidyl ethane sulfonic acid (guanyl taurine), creatine. Further stabilizers of the second group are, e. g., solubilized guanyl urea derivatives such as guanyl urea-N-sulfonic acid or N-nitro guanyl urea and solubilized biguanide derivatives particularly biguanidyl sulfonic and carboxylic acids such as, e. g., 2-biguanidyl naphthalene-1-sulfonic acid.

A third and less important group of stabilizers comprises cyanamide and cyanamide carboxylic acid.

The coupling components used in the stable ice color producing compositions are the usual ice color coupling components such as the naphthols, pyrazolones, hydroxy-benzofluorenones, benzonaphthols, and various N-substituted amides, particularly arylides of 2-hydroxy-3-naphthoic acid and its 5,6,7,8-tetrahydro derivative, of 2-hydroxy-3-anthroic acid, of methyl and dimethyl salicylic acids, of hydroxy-carbazole-carboxylic acids, of hydroxy-benzo-carbazole-carboxylic acids, of acetoacetic acid, of furoyl-acetic acid, of terephthaloyl-bis-acetic acid, of hydroxy-dibenzofuran-carboxylic acids, of hydroxy-dibenzothiophene carboxylic acids, etc.

So far it has been customary to dissolve the ice color producing compositions in water by the aid of caustic alkali together with an alcohol such as glycol ethyl ether, glycol butyl ether, butanol, cyclo-hexanol, etc.

According to the present invention, we have found that the lower aliphatic quaternary ammonium bases have a solvent action superior to that of the alkali metal hydroxides used heretofore, and at the same time have a district stabilizing action. Useful quaternary ammonium bases are, e. g., tetramethylammonium hydroxide, tetra-(beta-hydroxyethyl)-ammonium hydroxide, methyl-tri-(beta-hydroxyethyl)-ammonium hydroxide, trimethyl-(beta-hydroxyethyl)-ammonium hydroxide, alpha-glyceryl-tri-(beta-hydroxyethyl)-ammonium hydroxide and similar aliphatic bases. It should be noted that the stabilizing action of the hydroxylated bases, particularly of the tetra-(beta-hydroxyethyl)-ammonium hydroxide, on the diazo compound is superior, while on the other hand the solvent action of the tetra-methylammonium hydroxide is superior. Therefore, it is possible to determine for each specific case what base should be used in order to obtain a clear solution readily and also a stable solution.

Also bases containing more than one quaternary ammonium group may be usefully employed, e. g., ethylene bis-(trimethylammonium hydroxide). Also quaternary bases containing a heterocyclic ring such as dimethyl-cyclo-pentamethylene-ammonium hydroxide or bis-(beta-hydroxyethyl)-morpholinium hydroxide are very useful in preparing the solutions.

Quaternary bases of the high equivalent weight give clear and stable concentrated solutions aided by an alcohol being present. However, when such solutions are diluted with water and/or with a printing gum, they precipitate to some extent. Nevertheless, they still give smooth prints. Bases of this latter kind are, e. g., benzyl-trimethyl-ammonium hydroxide, benzyl-tri-(beta-hydroxyethyl)-ammonium hydroxide and phenyl-tri-methyl-ammonium hydroxide.

This invention is not restricted to the quaternary nitrogen bases just mentioned, but applies generally to quaternary ammonium bases containing alkyl, aralkyl, alicyclic, aryl or heterocyclic radicals.

In making up the solutions of the present invention, the stabilized diazo compound and the coupling component both may be converted completely into quaternary ammonium salts without any alkali being present, or part of the components might be employed in the form of an alkali salt and part in the form of a quaternary ammonium salt. Obviously, also mixtures of quaternary bases may be used, as the case might be. Part of the quaternary base might be replaced by an amine, such as triethanolamine.

The solutions preferably contain an additional organic solvent, particularly alcohols of the type referred to above which are very useful. The customary thickening agents such as e. g., a starch base or a gum tragacanth base may also be used.

The invention may be further illustrated by the following examples in which all parts are parts by weight.

*Example 1*

27 parts (100% basis) of the product made by the condensation of diazotized 2-methyl-5-chloroaniline with guanyl urea N-sulfonic acid according to U. S. Patent No. 2,154,470 (disodium salt) and 20.6 parts of 2-hydroxy naphthalene-3-carboxylic acid ortho-toluidide are stirred in 35 parts of ethylene glycol-monobutyl ether. 48 parts of a 65.6% aqueous solution of tetra-(beta-hydroxyethyl)-ammonium hydroxide

(HOCH₂CH₂)₄NOH and then water at 50° C. are added to make a total of 300 parts of solution.

This solution may be kept over a long period of time at temperatures within normal limits without decomposition or precipitation or coupling taking place.

25 parts of this solution is treated with 75 parts of a suitable printing thickener such as gum starch tragacanth solution. The paste is printed on cotton cloth from a copper roll, dried, aged with steam in the presence of acetic acid vapors, rinsed, soaped at elevated temperature, rinsed and dried. A brilliant red print of excellent fastness properties is obtained. Development of the dried print is also accomplished by aging at elevated temperature with steam in the presence of a mixture of acetic and formic acid, or formic acid alone, or by passing the dried print through a hot acid bath containing 31 parts of 50% acetic acid, 31 parts of formic acid, 10 parts of water, and 15–20 parts of sodium sulfate.

Other organic solvents, particularly alcoholic solvents such as normal butyl alcohol or cyclohexanol, may be substituted for the ethylene glycol-monobutylether in the solution described above. Solutions which possess similar properties are obtained when e. g. alpha-glyceryl-tri-(beta-hydroxyethyl)-ammonium hydroxide

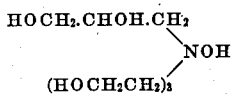

or beta-hydroxyethyl-trimethyl-ammonium hydroxide

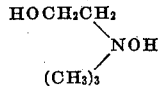

are used as quaternary bases.

The preparation of tetra-(beta-hydroxyethyl)-ammonium hydroxide is accomplished by the reaction of ethylene chlorohydrin and triethanolamine at elevated temperature. The quaternary ammonium chloride thus formed, and the other quaternary ammonium salts described herein, are converted to the free ammonium hydroxide either by addition of solid sodium hydroxide to an alcohol solution of the quaternary ammonium salt, filtration of the sodium halide thus precipitated, evaporation of the alcohol under reduced pressure, and solution of the free quaternary base in water, or for laboratory use also by reaction with moist silver oxide in water and filtration of the precipitated silver halide to yield a water solution of the quaternary ammonium hydroxide.

The alpha-glyceryl-tri-(beta-hydroxyethyl)-ammonium hydroxide employed in this example is prepared in the following manner:

74.5 parts of 98% triethanolamine are reacted with 55.2 parts of glycerine alpha-monochlorohydrin at 100° C. for 10 hours. The oily reaction product is washed by decantation with acetone to remove unreacted glycerine alpha-monochlorohydrin and triethanolamine. The washed residue is dissolved in 490 parts of 95% ethanol, the solution is filtered from a small amount of insoluble triethanolamine hydrochloride. The filtrate so obtained contains the quaternary ammonium chloride. This is converted to the free base by either of the procedures above described.

The beta-hydroxyethyl-trimethyl-ammonium hydroxide employed in this example is prepared in the following manner:

23.3 parts of ethylene bromohydrin are reacted with 11 parts of trimethylamine at room temperature in 206 parts of 1,4-dioxane. The reaction mixture is allowed to stand at room temperature for two days when the insoluble quaternary bromide is filtered, washed with 1,4-dioxane and dried. This product is converted to the free quaternary ammonium base by either of the methods described above.

After standing for four months the solution was made up into a printing paste and prints made which showed the same shade and strength as the prints made from the freshly prepared solution described above.

*Example 2*

4.5 parts of 2-hydroxy-naphthalene-3-carboxylic acid orthophenetidide are stirred in 8 parts of ethylene glycol-monobutylether, and are dissolved by the addition of 15.3 parts of a 23.6% aqueous solution of methyl-tri-(beta-hydroxyethyl)-ammonium hydroxide. 25.1 parts of water at 50° C. are added, and then 5.3 parts (100% basis) of a product made by condensation of diazotized 2-methyl-5-chloroaniline with guanyl urea-N-sulfonic acid according to U. S. Patent No. 2,154,470 (disodium salt) are dissolved in this solution. Total weight of 60 parts of solution is obtained.

This solution may be kept over a long period of time at temperatures within normal limits without decomposition or precipitation or coupling taking place.

Applied in the manner described under Example 1, it gives a brilliant scarlet print of excellent fastness properties.

Solutions of similar properties are obtained when the quaternary ammonium base employed in this solution is substituted by tetramethyl ammonium hydroxide or by alpha-glyceryl tri-(beta-hydroxylethyl)-ammonium hydroxide.

The preparation of methyl-tri-(beta-hydroxyethyl)-ammonium hydroxide is accomplished in the following manner: A solution of 425 parts of 98% triethanolamine and 156 parts of methyl chloride in 920 parts of methanol is heated and stirred in a steel autoclave for 2 hours at 40°–50° C.; for 1½ hours at 60°–70° C.; and for 3 hours at 80°–85° C. The autoclave is vented and the reaction mixture is filtered from a small amount of triethanolamine hydrochloride. The resultant solution contains the quaternary ammonium chloride which is converted to the free ammonium base by either of the methods described above in Example 1.

*Example 3*

2.3 parts of bis-acetoacetyl benzidide are stirred in 5 parts of ethylene-glycol monobutylether and are dissolved by the addition of 16.5 parts of 23.6% aqueous solution of methyl-tri-(beta-hydroxyethyl)-ammonium hydroxide. 18.8 parts of water at 50° C. and 1 part of glycerine are added. 4.82 parts (100% basis) of a product made by condensation of diazotized 2-methyl-5-chloroaniline with guanyl urea-N-sulfonic acid according to U. S. Patent 2,154,470 (disodium salt) are dissolved in the solution. Total weight of the solution is 50 parts.

This solution may be kept over a long period of time at temperatures within normal limits without decomposition, or precipitation, or coupling taking place.

This solution applied in the manner described in Example 1 yields a golden yellow print of excellent brightness and good fastness properties.

*Example 4*

4.7 parts of 2-hydroxynaphthalene-3-carboxylic acid orthoanisidide are stirred in 6 parts of ethylene glycol-monobutylether and are dissolved by the addition of 30.3 parts of a 7.2% aqueous solution of tetramethyl-ammonium-hydroxide. 1.8 parts of water are added and then 5.4 parts (100% basis) of the product made by condensation of diazotized 2-methoxy-5-chloroaniline with guanyl urea-N-sulfonic acid according to U. S. Patent No. 2,154,470 (dipotassium salt) are dissolved. A total weight of 50 parts of a stable solution is obtained.

When this solution is applied to the fiber by the procedure of Example 1, a very strong bluish red print is obtained of excellent fastness properties.

When, instead of the 2-hydroxy naphthalene-3-carboxylic acid ortho-anisidide, an equivalent quantity of bis-acetoacetyl ortho-tolidide is employed, the stable solution yields a bright greenish yellow print of good fastness properties.

Example 5

3.4 parts of 2-hydroxy-naphthalene-3-carboxylic acid ortho-toluidide are stirred in 7 parts of ethylene glycol-monobutyl ether and are dissolved by the addition of 9.2 parts of 55.9% aqueous solution of tetra-(beta-hydroxyethyl)-ammonium hydroxide. 24.3 parts of water at 50° C. are added and 4.77 parts (100% basis) of a product made by condensation of diazotized 2,5-dichloroaniline with 4-sulfo-2-amino benzoic acid according to the procedure described in U. S. Patent No. 1,858,623 are dissolved in this solution. Total weight of the solution obtained is 50 parts.

This stable solution when applied to the fiber according to the procedure described in Example 1, yields a scarlet print of yellowish shade and of good fastness properties.

When 3.6 parts of the ortho-anisidide replace the ortho-toluidide of 2-hydroxy naphthalene-3-carboxylic acid employed in the above solution and this is dissolved by the addition of 12.5 parts of a 23.6% aqueous solution of methyl-tri-(beta-hydroxyethyl)-ammonium hydroxide and 20.8 parts of water, a stable solution is obtained which on application to the fiber according to procedure described in Example 1, yields a scarlet print of good fastness properties.

Example 6

4.5 parts (100% basis) of a product made by condensation of diazotized 2-methyl-5-chloroaniline with guanyl urea-N-sulfonic acid according to U. S. Patent No. 2,154,470 (disodium salt) and 3.44 parts of 2-hydroxynaphthalene-3-carboxylic acid ortho-toluidide are stirred in 5.8 parts of ethylene-glycol monobutylether. 17.9 parts of a 12.9% aqueous solution of ethylene bis-(trimethylammonium hydroxide)

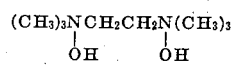

are added. Water at 50° C. is added to make a total of 50 parts of solution. This stable solution when applied in the manner described in Example 1, yields a strong red print of excellent fastness properties.

The ethylene bis-(trimethylammonium hydroxide) employed in the above solution is prepared in the following manner: 56 parts of trimethylamine and 46.5 parts of ethylene dibromide are dissolved in 160 parts of methanol. The solution is heated at 39°–40° C. for two days. An additional 30 parts of trimethylamine are added to the solution and heating is continued for one day. The reaction mixture is heated to 50° C. and filtered. The filtrate is evaporated to a syrupy residue which is triturated with 40 parts of alcohol. After filtering and washing with a small quantity of fresh alcohol, a greyish white crystalline residue is obtained. This ethylene bis-(trimethyl-ammonium-bromide) is converted to the bis-quaternary ammonium base by either of the procedures described above in Example 1.

Example 7

5.4 parts (100% basis) of the product made by condensation of diazotized 2-methyl-5-chloroaniline with guanyl urea-N-sulfonic acid according to U. S. Patent No. 2,154,470 (disodium salt) and 4.13 parts of 2-hydroxynaphthalene-3-carboxylic acid ortho-toluidide are stirred in 7 parts of ethylene glycol-monobutylether. 21.3 parts of a 27.1% aqueous solution of bis-(2-hydroxyethyl)-morpholinium hydroxide are added. Water at 50° C. is added to make a

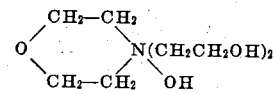

total of 50 parts of a stable solution.

The solution applied in the manner described above in Example 1 gives a brilliant red print of excellent fastness properties.

The bis-(2-hydroxyethyl)-morpolonium hydroxide employed in this solution is prepared in the following manner: 131 parts of morpholine and 188 parts of ethylene bromohydrin are stirred together in an ice bath for 20 hours. Then while stirring 99 parts of methanol are added and acetone is slowly dropped into the solution until precipitation starts. The reaction mixture is stirred for 20 hours to complete crystallization of the tertiary hydrobromide. 106 parts of the tertiary hydro-bromide is converted to the free base by the aid of an equivalent amount of sodium ethylate in 250 parts of alcohol. After filtration of the sodium bromide, 62.5 parts of ethylene bromohydrin is added to the filtrate, and this is heated for 8 hours at a gentle reflux. The reaction mixture is filtered and concentrated to a thick syrup by distillation at a reduced pressure. The oily residue is well washed by decantation with acetone and dried in vacuo. A syrupy product is obtained. The bis-(2-hydroxy-ethyl)-morpholonium bromide thus obtained is converted to the free quaternary ammonium base by either of the two methods described above.

Example 8

5.4 parts (100% basis) of the product made by condensation of diazotized 2-methyl-5-chloroaniline with guanyl urea-N-sulfonic acid according to U. S. Patent No. 2,154,470 (disodium salt) and 4.16 parts of 2-hydroxynaphthalene-3-carboxylic acid ortho-toluidide are stirred in 7 parts of ethylene glycol-monobutylether. 5.6 parts of a 55.9% aqueous solution of tetra-(beta-hydroxyethyl)-ammonium hydroxide and 2.55 parts of a 23.5% aqueous solution of sodium hydroxide are added. Water at 50° C. is added to make a total of 54 parts of solution.

This solution may be kept over a long period of time at temperatures within normal limits without decomposition or precipitation of coupling taking place.

The solution applied in the manner described under Example 1, gives a brilliant red print of excellent fastness properties.

Example 9

5.35 parts (100% basis) of the product made by condensation of diazotized 2-methyl-5-chloroaniline with guanyl urea-N-sulfonic acid according to U. S. Patent No. 2,154,470 (disodium salt) and 4.5 parts of 2-hydroxynaphthalene-3-carboxylic acid ortho-phenetidide and 0.3 parts of trisodium phosphate are stirred in 8 parts of ethylene glycol-mono-butylether. 6.7 parts of a 49% aqueous solution of methyl tri-(beta-hydroxyethyl)-ammonium hydroxide and 2.8 parts of 23.5% aqueous solution of sodium hydroxide are added. Water at 50° C. is added to make 60 parts of a stable solution.

The solution applied in the manner described above under Example 1, yields a brilliant scarlet print of excellent fastness properties.

*Example 10*

The product made by condensation of diazotized 2-methyl-5-chloroaniline and guanyl urea-N-sulfonic acid according to U. S. Patent No. 2,154,470 (disodium salt) may be dissolved together with an equivalent quantity of an ice color coupling component such as 2-hydroxynaphthalene-3-carboxylic acid ortho-toluidide in ethylene glycol-monobutylether or other alcoholic solvents, such as normal butyl alcohol or cyclohexanol and water by the aid of other quaternary ammonium bases, such as benzyl trimethyl-ammonium hydroxide, or benzyl tri-(beaa-hydroxyethyl)-ammonium hydroxide or phenyl-trimethyl-ammonium hydroxide. Stable concentrated solutions are obtained. When these solutions are employed in conjunction with suitable printing thickener, there is some precipitation according to the extent of dilution, but the print pastes so obtained when applied according to the procedure described in Example 1 yield strong, satisfactory prints.

The benzyl tri-(beta-hydroxyethyl)-ammonium hydroxide is prepared in the following manner: A mixture of 152 parts of 98% triethanolamine and 126.5 parts of benzyl chloride is heated and stirred at 60° C. for 7½ hours. The thick reaction product is washed by decantation with acetone and then is taken up in 225 parts of ethanol. The solution is filtered from triethanolamine hydrochloride and the resulting filtrate contains the quaternary ammonium chloride. This is converted to the free quaternary base by either of the procedures described in Example 1.

*Example 11*

49.3 parts of methyl-tri-(beta-hydroxyethyl)-ammonium chloride are dissolved by stirring in 49.0 parts of 95% alcohol, and 8.2 parts of sodium hydroxide dissolved in 5 parts of water are added. Sodium chloride precipitates. 25 parts of 2,5-dichloroaniline nitrosamine sodium salt (70.3% purity, with 7.9% sodium hydroxide, 1.3% sodium chloride and 20.5% water) are dissolved then in the solution. 6.2 parts of ethylene glycol-monoethyl ether are added, and then 18.0 parts of 2-hydroxy-naphthalene-3-carboxylic acid anilide are dissolved in the solution. The solution obtained is filtered from the precipitated sodium chloride to yield a reddish solution of strong greenish fluorescence.

The solution may be also prepared by filtration of the sodium chloride after the addition of sodium hydroxide to the alcohol solution of the quaternary ammonium chloride and then dissolving the remaining components in the clear filtrate.

The solution is stable, remaining clear at freezing temperatures and at higher temperatures not exceeding the normal limits.

10 parts of the solution so prepared are diluted with 20 parts of water and 70.0 parts of a suitable printing thickener such as gum-starch tragacanth, and the color paste is printed on cotton from a copper roll. The dried print is aged by steam; or by steam in the presence of acid vapors such as acetic or formic or acetic and formic acids; or by passing the print through a hot acid bath containing a weak acid. The developed print is rinsed, soaped at elevated temperature, rinsed and dried. A bright scarlet print is obtained.

What we claim is:

1. A stable aqueous solution of a composition capable of producing an ice color comprising an ice color diazo compound stabilized to prevent azoic coupling on the alkaline side, an ice color coupling component, and a quaternary ammonium base with at least one N-alkyl radical containing at least one hydroxyl group.

2. A stable aqueous solution of a composition capable of producing an ice color comprising an ice color diazo compound stabilized to prevent azoic coupling on the alkaline side, an ice color coupling component and tetra-(beta-hydroxy ethyl)-ammonium hydroxide.

3. A stable aqueous solution of a composition capable of producing an ice color comprising a stabilized diazo compound produced from a diazotized ice color component and guanyl urea-N-sulfonic acid, an ice color coupling component, and a quaternary ammonium base with at least one N alkyl radical containing at least one hydroxyl group.

4. A stable aqueous solution of a composition capable of producing an ice color comprising a stabilized diazo compound produced from a diazotized ice color component and guanyl urea-N-sulfonic acid, an ice color coupling component, and tetra-(beta-hydroxy ethyl)-ammonium hydroxide.

5. A stable aqueous solution of a composition capable of producing an ice color comprising a stabilized diazo compound produced from a diazotized ice color component and guanyl urea-N-sulfonic acid, an ice color coupling component, an alcohol and tetra-(beta-hydroxy ethyl)-ammonium hydroxide.

6. A stable aqueous solution of a composition capable of producing an ice color comprising the disodium salt of the stabilized diazo compound obtained from diazotized 2-methyl-5-chloroaniline and guanyl urea-N-sulfonic acid, the o-toluidide of 2-hydroxy-3-naphthoic acid, an alcohol and tetra-(beta-hydyroxy ethyl)-ammonium hydroxide.

7. A stable aqueous solution of a composition capable of producing an ice color comprising the disodium salt of the stabilized diazo compound obtained from diazotized 2-methyl-5-chloroaniline and guanyl urea-N-sulfonic acid, the o-phenetidide of 2-hydroxy-3-naphthoic acid, an alcohol and tetra-(beta-hydyroxy ethyl)-ammonium hydroxide.

8. A stable aqueous solution of a composition capable of producing an ice color comprising the disodium salt of the stabilized diazo compound obtained from diazotized 2-methyl-5-chloroaniline and guanyl urea-N-sulfonic acid, the benzidide of acetoacetic acid, an alcohol and tetra-(beta-hydroxy ethyl)-ammonium hydroxide.

HANS Z. LECHER.
ROBERT P. PARKER.